(12) United States Patent
Chen et al.

(10) Patent No.: US 6,327,980 B1
(45) Date of Patent: Dec. 11, 2001

(54) LOCOMOTIVE ENGINE INLET AIR APPARATUS AND METHOD OF CONTROLLING INLET AIR TEMPERATURE

(75) Inventors: Gong Chen; Gregory A. Marsh, both of Erie; Ronald H. Till, Fairview; Peter L. Valentine, Erie, all of PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/515,459

(22) Filed: Feb. 29, 2000

(51) Int. Cl.$^7$ ........................................... B61C 5/02
(52) U.S. Cl. ..................... 105/26.05; 105/61; 105/62.1
(58) Field of Search ............................. 105/26.05, 61, 105/62.1; 123/556, 559.1

(56) References Cited

U.S. PATENT DOCUMENTS

| | | |
|---|---|---|
| 3,801,078 | 4/1974 | Denton et al. . |
| 3,830,210 | * 8/1974 | Muller et al. .................... 123/122 D |
| 3,913,544 | 10/1975 | Fvie . |
| 3,918,421 | * 11/1975 | Berry et al. ...................... 123/122 D |
| 4,122,679 | * 10/1978 | Charron ................................. 60/599 |
| 4,126,110 | 11/1978 | Simmons . |
| 4,144,857 | * 3/1979 | Bendig et al. ................... 123/122 D |
| 4,175,524 | 11/1979 | Coddington . |
| 4,295,454 | * 10/1981 | Iida ...................................... 123/556 |
| 4,565,176 | * 1/1986 | Alf et al. ............................. 123/556 |
| 5,189,905 | * 3/1993 | Waldrop .............................. 73/54.09 |
| 5,551,384 | * 9/1996 | Hollis ................................ 123/142.5 |

FOREIGN PATENT DOCUMENTS

| | | | |
|---|---|---|---|
| 2340216-A | * 8/1974 | (DE) | ................................ F02D/5/00 |
| 2602989-A1 | * 8/1976 | (DE) | ................................ F02D/5/00 |
| 0491275-A1 | * 6/1992 | (EP) . | |
| WO-97/13153-A1 | * 4/1997 | (FR) | ................................ G01P/5/14 |
| 2093120-A | * 8/1982 | (GB) | ............................. F02M/31/06 |
| 0491275-A1 | * 6/1992 | (GB) | ............................. G01D/21/02 |

* cited by examiner

*Primary Examiner*—S. Joseph Morano
*Assistant Examiner*—Frantz F. Jules
(74) *Attorney, Agent, or Firm*—Carl A. Rowold, Esq.; David G. Maire, Esq.; Beusse Brownlee Bowdoin & Wolter, PA

(57) ABSTRACT

Automatic control of the temperature of the inlet air being supplied to the engine (12) of a locomotive (10) in order to optimize the performance of the engine (12) under a variety of ambient air temperatures and pressures. One or more valves (38) is utilized to control the flow of warm air from the engine compartment (14) into the air inlet path (20). The position of valve (38) is controlled by controller (42) in response to at least one of an ambient air temperature signal $T_A$, an ambient atmospheric pressure signal $P_A$, and an inlet air temperature signal $T_I$. The temperature of the air flowing through the warm air flow path 28 may be controlled by selecting from among a plurality of possible inlets (30, 32, 50). By varying the volume and temperature of the air flowing through the warm air flow path (28), the temperature and density of the air supplied at the engine inlet (18) may be moderated across a broad range of ambient air temperatures and pressures.

21 Claims, 1 Drawing Sheet

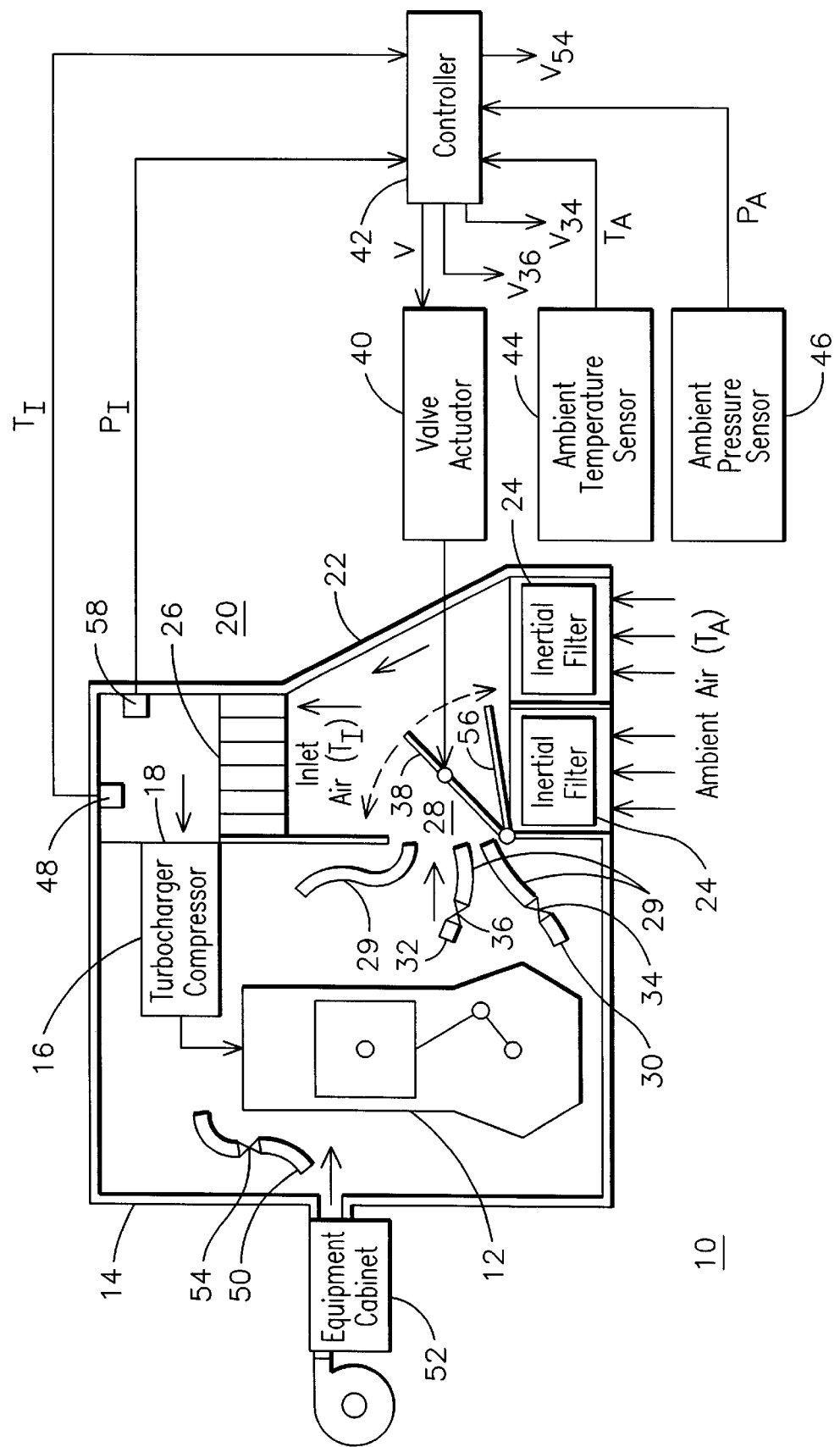

LOCOMOTIVE ENGINE INLET AIR APPARATUS AND METHOD OF CONTROLLING INLET AIR TEMPERATURE

BACKGROUND OF THE INVENTION

The present invention relates generally to the field of internal combustion engines and, more particularly, to the control of an internal combustion engine of a locomotive to reduce the adverse effects of ambient air temperature changes on the performance of the engine.

Locomotives operated in the far north and south regions of the globe are subject to severe winter weather conditions, including cold temperatures, and blowing and drifting snow. It is known that snow may be drawn into the air inlet ducts of a locomotive and may accumulate in sufficient quantities to obstruct the passage of air through the ducts. It is not uncommon for snow to accumulate on air filters disposed in the air inlet pathway of a locomotive. Such accumulations of snow may reduce the power output of the engine or cause it to cease from operating completely.

It is known to provide summer/winter doors in a locomotive which function to connect the air inlet duct with a source of warm air so that the cold ambient air is mixed with relatively warmer air prior to passing through the final air filters. If the temperature of the inlet air mixture can be maintained above the freezing point, any snow that may be deposited on the filters or ductwork will melt rather than accumulating to the point of restricting intake air. The name "summer/winter" has been applied to these doors because in the prior art they were manually operated using a simple rule of thumb, such as open in the winter and close in the summer. Warm air is available in the engine compartment of a locomotive because radiant and convected heat from the engine tends to raise the air temperature around the engine. Because of the need to protect components such as wires, hoses and fuel lines from high temperatures, locomotive engine compartments are normally ventilated. It is known to pass the exhaust air from an equipment cabinet of the locomotive into the engine compartment to provide such ventilation. The exhaust from an equipment cabinet contains filtered and slightly pressurized air from an equipment blower, and it passes out of the equipment cabinet at a relatively low temperature. This air is exhausted through the engine compartment and into the combustion air intake ductwork through the summer/winter doors.

It is known to increase the flow of warm air from the engine compartment to the inlet air supply ductwork by at least partially restricting the ambient air inlet openings when the summer/winter doors are opened. By simultaneously restricting the inlet of cold ambient air when the winter/summer doors are opened, the percentage of warm air drawn into the engine is increased. The use of such doors also helps to maintain the original air velocity through any upstream inertial filters. By maintaining the air velocity through the inertial filters, the efficiency of the inertial filters in removing snow from the intake air is maintained.

There is a continued demand for improved performance of locomotive engines, in terms of fuel economy, component loading, power output and reduced emissions. To achieve such optimized performance, the conditions of combustion within the internal combustion engine needs to be controlled. However, engine designs are limited because of the extremes of environmental conditions under which a locomotive must operate. For example, cylinder peak firing pressure may become too high as the engine is operating during cold days when the inlet air temperature is very low, thus generating excessive stress on engine components. Alternatively, cylinder exhaust temperatures may become too high as the engine is operating during hot days when the inlet air temperature is very high, thus causing turbocharger damage due to overheating and overspeed. Very high inlet air temperature may also increase engine exhaust emissions such as smoke, carbon monoxide (CO), and particulate matter (PM).

BRIEF SUMMARY OF THE INVENTION

Thus, there is a need to provide a locomotive having a reduced sensitivity to the wide range of environmental conditions under which it must operate. There is further a need for a method of operating a locomotive that makes it less sensitive to changes in ambient environmental conditions.

Disclosed herein is an apparatus and a method for reducing the sensitivity of a locomotive engine to changes in the ambient air temperature and pressure. A method for controlling a locomotive engine is described having the steps of: providing a warm air flow path between the engine compartment and the air inlet path; providing a valve for controlling the flow of warm air through the warm air flow path; measuring the ambient air temperature; and controlling the position of the valve in response to the ambient air temperature. The method may include the further steps of: measuring the ambient atmospheric pressure; and controlling the position of the valve in response to the ambient air temperature and the ambient atmospheric pressure.

A locomotive is described herein including: an engine disposed in an engine compartment and operable to burn fuel with air to produce power for the locomotive; an air inlet path for directing air to the engine; a warm air flow path connected between the engine compartment and the air inlet path; a valve disposed in the warm air flow path; sensors operable to produce an ambient air temperature signal responsive to the ambient air temperature and an ambient air pressure signal responsive to the ambient air atmospheric pressure; and a controller having the ambient air temperature signal as an input and operable to produce a valve position signal responsive to the ambient air temperature signal and optionally the ambient air pressure signal, wherein the valve is responsive to the valve position signal to control the flow of warm air through the warm air flow path.

BRIEF DESCRIPTION OF THE DRAWING

The features and advantages of the present invention will become apparent from the following detailed description of the invention when read with the accompanying drawing, in which a locomotive is illustrated having an automatic apparatus for regulating the temperature of the inlet air supplied to the engine.

DETAILED DESCRIPTION OF THE INVENTION

The FIGURE is a schematic illustration of a locomotive 10 powered by an internal combustion engine 12 located within an engine compartment 14 of the locomotive 10. The engine 12 may be naturally aspirated or may be a turbocharged diesel engine provided with combustion air by compressor 16 as shown in the FIGURE. The term "combustion air" is used herein to refer to the air entering the engine cylinders, downstream of any turbocharger or supercharger. The term "air used for combustion" as used herein is meant to include the air at any point of its path, from the ambient environment outside the locomotive inlet, through the inlet air ductwork, through the turbocharger, if any, and into the engine cylinders. An engine inlet 18 for air is in fluid communication with an air inlet path 20 including ductwork 22, a plurality of inertial filters 24, and final air filters 26. Ambient air is drawn through the inertial filters 24 and is directed by the ductwork 22 through the final air filters 26 to the engine inlet 18. Air may be provided to the engine 12 from the engine compartment 14 through a warm air flow path 28. The term "warm air flow path" is used herein, however, air provided there through could be conditioned to a temperature lower than the ambient air temperature. Such a cooled air flow path embodiment is not being implemented by the assignee of the present invention at the present time. The warm air flow path 28 may be as simple as an opening in the air inlet ductwork 22, or it may include a separate arrangement of ductwork 29 for selectively drawing conditioned air from predetermined locations within the engine compartment 14. Valve 38 is disposed within the warm air flow path 28 and is operable to control the flow of warm air through the warm air flow path 28. Valve 38 may be a moveable door formed in ductwork 22, or it may be some form of butterfly, ball or gate valve or other such device operable alternatively to permit and to restrict air flow. The geometric type, size and flow area of the valve 38 are selected to be suitable for the air flow performance and capacity required for a particular application. Valve 38 may include one or a plurality of individual valves. The open/close position of valve 38 is controlled by an actuator 40 operable to move valve 38 from a first position wherein no warm air is provided to the combustion air inlet path 20, to a second open position wherein warm air is permitted to flow through the warm air flow path 28 to the engine inlet 18. Valve actuator 40 may be any such device known in the art, such as for example an electrical solenoid, a motor driven actuator, a hydraulic or a pneumatic actuator.

The warm air flow path 28 may include inlets located at more than one location within the engine compartment 14. For example, one inlet 30 for warm air flow path 28 may be located proximate an exhaust pipe of engine 12 in order to draw air warmed to a very high temperature. A second inlet 32 may be located away from the hottest parts of engine 12 in order to draw air warmed to a lesser degree. The distribution of air flowing from inlets 30, 32 may be controlled by the positioning of valves 34, 36, respectively.

The positioning of valve 38 by actuator 40 is controlled by controller 42. Controller 42 may be any such device known in the art, such as a computer or microprocessor, a programmed logic controller, or a simple electromechanical device. Controller 42 may include a set of programmed logic instructions for the control of the temperature and/or density of the combustion air. Controller 42 may receive as input one or more of the following input signals: an ambient air temperature signal $T_A$, an ambient atmospheric pressure signal $P_A$, an inlet air temperature signal $T_I$, and an inlet air pressure signal $P_I$. An ambient temperature sensor 44 is operable to sense the temperature of the ambient air being drawn into locomotive 10 and to generate signal $T_A$ in response to that air temperature. Ambient temperature sensor 44 may be any such device known in the art, such as for example a resistance temperature detector (RTD). Similarly, ambient atmospheric pressure sensor 46 is operable to generate signal $P_A$ responsive to the ambient barometric pressure surrounding the locomotive 10. Ambient atmospheric pressure sensor 46 may be any such devise known in the art. Inlet air temperature sensor 48 is located proximate the inlet 18 of engine 12, in order to sense the temperature of the air being drawn into engine 12. Inlet air temperature sensor 48 may be an RTD or other known device. The inlet air temperature is directly related to the ambient air temperature and to the position of valve 38, therefore, inlet air temperature signal $T_I$ is an indirect measure of the ambient temperature, Inlet air pressure sensor 58 senses the pressure of the inlet air at a location downstream of final air filters 26.

Controller 42 is operable to generate a valve position signal V operable to control valve actuator 40 to position valve 38 to a desired position. The performance of internal combustion engine 12 may depend upon the density of the air supplied to the engine 12. Once an inlet air density range for preferred operation of engine 12 is established by the engine designer, a corresponding inlet air temperature range may be determined based upon the relationship of air temperature and air pressure to air density. In one embodiment, controller 42 is programmed to provide an appropriate valve position signal V in response to the single variable of the measured ambient air temperature $T_A$. In this manner, the inlet air temperature being supplied to the engine 12 may be maintained within the calculated inlet air temperature range corresponding to the preferred inlet air density range. For example, when the ambient air temperature $T_A$ drops below a predetermined value, valve position signal V may be provided to the valve actuator 40 to open valve 38, thereby providing warm air to mix with the ambient air within the combustion air inlet path 20.

Because the density of the inlet air may vary depending upon the altitude and weather conditions encountered by the locomotive 10, it may be desired to adjust the determined inlet air temperature range to take into account the actual ambient atmospheric pressure. Controller 42 may include logic for utilizing signal $P_A$ when generating valve control signal V. Such logic may function to somewhat increase the temperature of the inlet air when the locomotive encounters a relatively high ambient atmospheric pressure.

In a further embodiment, controller 42 may utilize signal $T_I$ as a direct indication of the temperature of the inlet air, and may generate valve control signal V in response to the inlet air temperature signal $T_I$. A simple logic that may be implemented in controller 42 is to provide a valve position signal V to open valve 38 when the temperature of the inlet air $T_I$ is below a predetermined value, and to close valve 38 when $T_I$ is above a predetermined value. The predetermined value may be a fixed parameter, or it may be a calculated number corresponding to a measured ambient atmospheric pressure signal $P_A$. The predetermined values for opening valve 38 and for closing valve 38 may be different numbers in order to avoid unnecessary cycling of the valve.

The specific logic utilized in controller 42 for the control of the inlet air temperature may vary depending upon the specific requirements of a particular application. For a typical locomotive engine 12, it may be sufficient to control valve 38 to only two alternative positions, fully open and fully closed. Alternatively, valve 38 may have a plurality of discrete intermediate positions between a fully open position and a fully closed position, or an infinitely variable range of motion there between. If more than one valve 38 is provided, controller 42 may generate a corresponding plurality of valve control signals to open the individual valves in sequence, thereby providing a finer degree of control. Furthermore, controller 42 may also be programmed to generate control signals $V_{34}$ and/or $V_{36}$ to control the position of valves 34, 36 to further affect the temperature of the warm air passing through the warm air flow path 28. By individually or jointly controlling the positions of valves 34, 36, 38, a wide ranger of ambient air temperatures may be moderated to achieve a preferred range of temperatures for the air provided at inlet 18.

With valve 38 in the closed position, the air pressure and density in ductwork 22 is slightly lower than in the ambient air due to the restriction imposed by the inertial filters 24. As valve 38 is opened to admit hotter and less dense air from the engine compartment at a pressure slightly above ambient air pressure, the pressure in ductwork 22 will rise slightly, thereby offsetting to some extent the desired reduction in inlet density afforded by the warm engine compartment air mixing with the cold ambient air. Because the pressure differential across the inertial filters 24 is now reduced, it is known that their filtering performance may be degraded also. And as long as the pressure in ductwork 22 is below ambient air pressure, there will continue to be some cold, dense air coming through the inertial filters 24, thus limiting how high the inlet air temperature can be raised (and the inlet air density lowered) by opening valve 38. To improve the performance of this system, there may also be provided a means for restricting the flow of ambient air through one or more of the plurality of inertial filters 24 during periods when valve 38 is positioned to permit the flow of air through warm air flow path 28. One such means may be a door 56 operable in conjunction with valve 38 to block the flow of air through one or more of the inertial filters 24 when valve 38 moves away from a fully closed position. Door 56 may have a separate actuator or may be moved in conjunction with valve 38 by actuator 40. Other means for restricting the flow of air through filters 24 may include flow control valves associated with one or more of the individual inertial filters 24. By decreasing the total flow area through the inertial filters 24 when air is being supplied through the warm air flow path 28, the pressure in ductwork 22 may be maintained at a level sufficiently below ambient pressure such that the air velocity in, and the filtering performance of, the remaining inertial filter(s) 24 may be maintained. Decreasing the flow area through the inertial filters 24 will also induce a higher percentage of the inlet air to be drawn through the warm air flow path 28, and by this means will increase the extent to which the temperature of the inlet air may be raised (and the inlet air density lowered). Finally, because the pressure in the inlet ductwork 22 is lowered by decreasing the flow area through the inertial filters 24, the closing of door 56 may be used to prevent, at least to an extent, the inlet ductwork 22 pressure from rising when valve 38 is partially or fully opened.

A pressure sensor 58 measures the pressure of the air within inlet air path 22 downstream of final air filters 26. Pressure sensor 58 provides a signal $P_I$ corresponding to that pressure to controller 42. In the prior art it is known to monitor the pressure differential across air filters and to restrict the power output of engine 12 if that difference exceeds a predetermined value. The pressure differential across the final air filters may be measured indirectly by comparing the ambient air pressure and the pressure of the air within duct 22 downstream of final air filters 26. This protection scheme prevents adverse effects on the engine 12 due to clogged filters, and it provided an indication to the operator that maintenance was needed on the filters 26. A build-up of snow and/or ice on the final air filters 26 could also result in the pressure differential set point being exceeded. To alleviate this situation, in one embodiment of the present invention, controller 42 may provide a signal to open, or to more fully open, valve 38 when the pressure differential across the filters exceeds a predetermined value at times when the ambient temperature is below a predetermined value, such as the freezing temperature of water. Similarly, that signal may be used to control door 56 to fully restrict the flow of air through its associated inertial filters 24. This control scheme is designed to avoid any reduction in engine power resulting from accumulated snow or ice. Controller 42 would included programmed logic operative to compare the signals from ambient pressure sensor 46 and inlet air pressure sensor 58, and when the indicated pressure differential exceeds a predetermined value and the ambient temperature as measured by sensor 44 is below a predetermined value, to issue a valve position control signal V to more fully open valve 38 and/or to close door 56. The set point for this valve opening action is preferably a differential pressure value less than the pressure differential resulting in a reduction in the power output of the engine 12, While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A method for controlling a locomotive engine, the engine being located in an engine compartment of the locomotive, the engine having an air inlet path, the method comprising the steps of:

providing a warm air flow path between the engine compartment and the air inlet path;

providing a valve for controlling the flow of warm air through the warm air flow path; and measuring the ambient air temperature;

controlling the position of the valve in response to the ambient air temperature;

wherein the step of providing a warm air flow path further comprises connecting the warm air flow path to the air inlet path at a point downstream of a plurality of inertial filters disposed in the air inlet path, and further comprising the step of blocking the flow of air through at least one of the plurality of inertial filters when the valve is positioned to allow warm air to flow through the warm air flow path.

2. The method of claim 1, further comprising the steps of:

providing an ambient temperature sensor for producing an ambient air temperature signal responsive to the ambient air temperature;

providing a controller for receiving the ambient air temperature signal and for generating a valve position signal responsive to the ambient air temperature signal;

providing an actuator for controlling the position of the valve in response to the valve position signal.

3. The method of claim 1, further comprising the steps of:

measuring the ambient atmospheric pressure; and controlling the position of the valve in response to the ambient air temperature and the ambient atmospheric pressure.

4. The method of claim 1, further comprising the step of controlling the position of the valve to be one of a plurality of discrete positions between a fully open position and a fully closed position in response to the ambient air temperature being in one of a respective plurality of temperature ranges.

5. A method for controlling a locomotive engine, the engine being located in an engine compartment of the locomotive, the engine having an air inlet path, the method comprising the steps of:

providing a warm air flow path between the engine compartment and the air inlet path;

providing a valve for controlling the flow of warm air through the warm air flow path; and measuring the ambient air temperature;

controlling the position of the valve in response to the ambient air temperature;

providing a plurality of inlets for the warm air flow path, each of the plurality of inlets receiving air at a temperature different than the temperature of the air received by the other of the inlets; and controlling the flow of air through the respective plurality of inlets in response to the ambient air temperature.

6. A method for controlling a locomotive engine, the engine being located in an engine compartment of the locomotive, the engine having an air inlet path for directing air into the engine, the method comprising the steps of:

defining an air density range for preferred operation of the engine;

determining an air temperature range corresponding to the air density range;

providing a warm air flow path between the engine compartment and the air inlet path;

providing a valve for controlling the flow of warm air through the warm air flow path;

measuring the ambient air temperature;

controlling the position of the valve in response to the ambient air temperature to maintain the inlet air temperature within the air temperature range;

measuring the ambient atmospheric pressure; and wherein the step of determining further comprises determining an air temperature range corresponding to the air density range for the measured ambient atmospheric pressure.

7. The method of claim 6, wherein the step of providing a warm air flow path further comprises connecting the warm air flow path to the air inlet path at a point downstream of a plurality of inertial filters disposed in the air inlet path, and further comprising the step of blocking the flow of air through at least one of the plurality of inertial filters when the valve is positioned to allow warm air to flow through the warm air flow path.

8. The method of claim 6, further comprising the steps of:

providing a plurality of inlets for the warm air flow path, each of the plurality of inlets receiving air at a temperature different than the temperature of the air received by the other of the inlets; and controlling the flow of air through the respective plurality of inlets in response to the ambient air temperature.

9. A method for controlling a locomotive engine, the engine being located in an engine compartment of the locomotive, the engine having an air inlet path, the method comprising the steps of:

providing a conditioned air flow path between the engine compartment and the air inlet path for providing air cooled to below ambient air temperature;

providing a valve for controlling the flow of air through the conditioned air flow path; and measuring the temperature of air used for combustion in the engine;

controlling the position of the valve in response to the temperature.

10. The method of claim 9, wherein the step of measuring further comprises measuring the temperature at a location proximate an inlet to the engine.

11. The method of claim 9, wherein the step of measuring further comprises measuring the ambient air temperature.

12. The method of claim 9, further comprising the steps of:

measuring the ambient atmospheric pressure; and controlling the position of the valve in response to the temperature and the ambient atmospheric pressure.

13. A locomotive comprising:

an engine disposed in an engine compartment of the locomotive and operable to burn fuel with air to produce power for the locomotive;

an air inlet path for directing air to the engine;

a warm air flow path connected between the engine compartment and the air inlet path;

a valve disposed in the warm air flow path;

a sensor operable to produce an air temperature signal responsive to the ambient air temperature; and a controller having the air temperature signal as an input and operable to produce a valve position signal responsive to the ambient air temperature signal, wherein the valve is responsive to the valve position signal to control the flow of warm air through the warm air flow path;

a sensor operable to produce an atmospheric pressure signal responsive to the ambient atmospheric pressure, the atmospheric pressure signal being provided as an input to the controller; and the controller being operable to produce the valve position signal in response to the air temperature signal and the atmospheric pressure signal.

14. A locomotive comprising:

an engine disposed in an engine compartment of the locomotive and operable to burn fuel with air to produce power for the locomotive;

an air inlet path for directing air to the engine;

a warm air flow path connected between the engine compartment and the air inlet path;

a valve disposed in the warm air flow path;

a sensor operable to produce an air temperature signal responsive to the ambient air temperature; and a controller having the air temperature signal as an input and operable to produce a valve position signal responsive to the ambient air temperature signal, wherein the valve is responsive to the valve position signal to control the flow of warm air through the warm air flow path;

a plurality of inertial filters disposed in the inlet air path;

a door operable to block the flow of air through at least one of the plurality of inertial filters when the valve is in a position to permit the flow of warm air from the engine compartment through the warm air pathway to the air inlet path.

15. A locomotive comprising:

an engine disposed in an engine compartment of the locomotive and operable to burn fuel with air to produce power for the locomotive;

an air inlet path for directing air to the engine;

a warm air flow path connected between the engine compartment and the air inlet path;

a valve disposed in the warm air flow path;

a sensor operable to produce an air temperature signal responsive to the ambient air temperature; and a controller having the air temperature signal as an input and operable to produce a valve position signal responsive to the ambient air temperature signal, wherein the valve is responsive to the valve position signal to control the flow of warm air through the warm air flow path;

a plurality of inlets to the warm air flow path, each of the plurality of inlets receiving air at a temperature different than the temperature of the air received by the other of the inlets; and a valve associated with each of the plurality of inlets;

wherein the controller is operable to produce a valve position signal for each respective valve associated with each of the plurality of inlets to control the flow of air through the respective inlets.

16. In a locomotive having an internal combustion engine disposed in an engine compartment, an air supply apparatus comprising:

an ambient air inlet pathway for providing ambient air to the engine;

a warm air pathway connected between the engine compartment and the ambient air inlet pathway;

a valve disposed in the warm air pathway and operable to control the amount of warm air flowing from the engine compartment into the ambient air inlet pathway;

an ambient air temperature sensor operable to generate an ambient air temperature signal; and a valve controller having as an input the ambient air temperature signal and operable to control the position of the valve in response to the ambient air temperature signal;

an atmospheric air pressure sensor operable to provide an atmospheric air pressure signal to the valve controller; and the valve controller being operable to control the position of the valve in response to the ambient air temperature signal and the atmospheric air pressure signal.

17. In a locomotive having an internal combustion engine disposed in an engine compartment, an air supply apparatus comprising:

an ambient air inlet pathway for providing ambient air to the engine;

a warm air pathway connected between the engine compartment and the ambient air inlet pathway;

a valve disposed in the warm air pathway and operable to control the amount of warm air flowing from the engine compartment into the ambient air inlet pathway;

an ambient air temperature sensor operable to generate an ambient air temperature signal; and a valve controller having as an input the ambient air temperature signal and operable to control the position of the valve in response to the ambient air temperature signal;

a plurality of inertial filters disposed in the ambient air inlet pathway;

a door for blocking the flow of air through at least one of the plurality of inertial filters when the valve is in a position to permit the flow of warm air from the engine compartment through the warm air pathway to the ambient air inlet pathway.

18. In a locomotive having an internal combustion engine disposed in an engine compartment, an air supply apparatus comprising:

an ambient air inlet pathway for providing ambient air to the engine;

a warm air pathway connected between the engine compartment and the ambient air inlet pathway;

a valve disposed in the warm air pathway and operable to control the amount of warm air flowing from the engine compartment into the ambient air inlet pathway;

an ambient air temperature sensor operable to generate an ambient air temperature signal; and a valve controller having as an input the ambient air temperature signal and operable to control the position of the valve in response to the ambient air temperature signal;

a plurality of inlets to the warm air flow path, each of the plurality of inlets receiving air at a temperature different than the temperature of the air received by the other of the inlets; and a valve associated with each of the plurality of inlets;

wherein the controller is operable to produce a valve position signal for each respective valve associated with each of the plurality of inlets to control the flow of air through the respective inlets.

19. A locomotive engine air supply apparatus comprising:

an ambient air flow path in fluid communication with an inlet of the engine;

a conditioned air flow path in fluid communication with the ambient air flow path for providing air cooled to below ambient air temperature;

a valve disposed in the conditioned air flow path and operable to control the flow of conditioned air through the conditioned air flow path;

a sensor for producing an inlet air temperature signal in response to the temperature of air being provided to the engine;

a controller having the inlet air temperature signal as an input and operable to produce a valve position signal responsive to the inlet air temperature signal; and an actuator having the valve position signal as an input and operable to position the valve in response to the valve position signal.

20. A method for controlling a locomotive engine, the engine being located in an engine compartment of the locomotive, the engine having an air inlet path containing an air filter, the method comprising the steps of:

providing a warm air flow path between the engine compartment and the air inlet path, the warm air flow path connecting with the air inlet path upstream of the filter;

providing a valve for controlling the flow of warm air through the warm air flow path; and measuring the ambient air temperature;

measuring the differential pressure across the filter;

controlling the valve to open when the differential pressure exceeds a predetermined value and the ambient air temperature is below a predetermined temperature.

21. A method of controlling the build-up of ice on a filter disposed in the combustion air flow path of an engine of a locomotive, the method comprising:

providing a sensor for monitoring differential air pressure across the filter;

providing a sensor for monitoring combustion air temperature;

detecting ice on the filter by determining that the differential air pressure exceeds a predetermined value when the ambient air temperature is below a predetermined temperature; and providing a supply of warm air to the combustion air flow path upstream of the filter to melt the detected ice.

* * * * *